US012070959B2

(12) United States Patent
Osakabe

(10) Patent No.: US 12,070,959 B2
(45) Date of Patent: Aug. 27, 2024

(54) PRINTING APPARATUS, INFORMATION PROCESSING METHOD, AND STORAGE MEDIUM

(71) Applicant: CASIO COMPUTER CO., LTD., Tokyo (JP)

(72) Inventor: Fumihiro Osakabe, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 165 days.

(21) Appl. No.: 17/838,912

(22) Filed: Jun. 13, 2022

(65) Prior Publication Data

US 2023/0001720 A1 Jan. 5, 2023

(30) Foreign Application Priority Data

Jul. 1, 2021 (JP) ................................ 2021-109804
Apr. 6, 2022 (JP) ................................ 2022-063250

(51) Int. Cl.
*B41J 29/38* (2006.01)
*A45D 34/04* (2006.01)
*B41J 2/175* (2006.01)
*B41J 3/407* (2006.01)

(52) U.S. Cl.
CPC ............. *B41J 29/38* (2013.01); *A45D 34/04* (2013.01); *B41J 2/175* (2013.01); *B41J 3/407* (2013.01)

(58) Field of Classification Search
CPC ... B41J 29/38; B41J 2/175; B41J 3/407; B41J 2/17513; B41J 3/36; A45D 34/04; A45D 2029/005; A61M 35/20
USPC .............................................................. 347/6
See application file for complete search history.

(56) References Cited

U.S. PATENT DOCUMENTS

| | | | | |
|---|---|---|---|---|
| 9,949,552 B2 | | 4/2018 | Rabe et al. | |
| 10,556,435 B2 | | 2/2020 | Kunifuji et al. | |
| 2007/0070097 A1 | * | 3/2007 | Bich | B43K 8/00 347/19 |
| 2007/0237560 A1 | * | 10/2007 | Brown | B41J 3/46 400/88 |
| 2008/0075513 A1 | * | 3/2008 | Robertson | B41J 2/165 400/88 |

FOREIGN PATENT DOCUMENTS

| | | |
|---|---|---|
| JP | H08276599 A | 10/1996 |
| JP | 2012139850 A | 7/2012 |
| JP | 5597077 B2 | 8/2014 |
| JP | 6206015 B2 | 9/2017 |
| JP | 2019141684 A | 8/2019 |
| WO | 2017217001 A1 | 12/2017 |

OTHER PUBLICATIONS

Japanese Office Action (and an English language translation thereof) dated Apr. 25, 2023, issued in counterpart Japanese Application No. 2022-063250.

* cited by examiner

*Primary Examiner* — Jason S Uhlenhake
*Assistant Examiner* — Alexander D Shenderov
(74) *Attorney, Agent, or Firm* — Holtz, Holtz & Volek PC

(57) ABSTRACT

A printing apparatus includes at least one processor, an apparatus main body that is capable of holding a tank that stores liquid; and a sensor that detects at least a state of motion of the tank. The processor outputs dispersion information showing an operation to move the apparatus main body to disperse the liquid in the tank based on the state of the motion of the tank detected by the sensor.

19 Claims, 6 Drawing Sheets

PRINTING APPARATUS, INFORMATION PROCESSING METHOD, AND STORAGE MEDIUM

CROSS-REFERENCE TO RELATED APPLICATION

This application is based upon and claims the benefit of priority under 35 USC 119 of Japanese Patent Application No. 2021-109804, filed on Jul. 1, 2021 and Japanese Patent Application No. 2022-063250, filed on Apr. 6, 2022, the entire disclosure of which, including the description, claims, drawings, and abstract, is incorporated herein by reference in its entirety.

BACKGROUND

1. Field of the Invention

The present disclosure relates to a printing apparatus, an information processing method, and a storage medium.

2. Description of the Related Art

When makeup is applied on human skin, a person uses makeup tools such as a sponge or a brush to apply cosmetics on the skin. Lately, instead of a person performing such applying procedures, there is an apparatus that applies (prints) a liquid in a color of the skin (cosmetic ink) to the skin (for example, JP 2019-141684).

According to such apparatus, a liquid for skin (treatment composition) is sprayed to a surface of the skin from a nozzle using an inkjet method and it is possible to form a film on a portion where there is a deviation on the skin.

BRIEF SUMMARY OF THE INVENTION

A printing apparatus includes, at least one processor; an apparatus main body that is capable of holding a tank that stores liquid; and a sensor that detects at least a state of motion of the tank, wherein the processor outputs dispersion information showing an operation to move the apparatus main body to disperse the liquid in the tank based on the state of the motion of the tank detected by the sensor.

DETAILED DESCRIPTION OF THE INVENTION

An embodiment of a printing apparatus, an information processing method, and a storage medium according to the present disclosure is described with reference to FIG. 1 to FIG. 7.

Various limitations that are technically preferable for implementing the disclosure are added to the embodiments described below. However, the scope of the disclosure is not limited by the embodiments and the illustrated examples.

Figure 1:
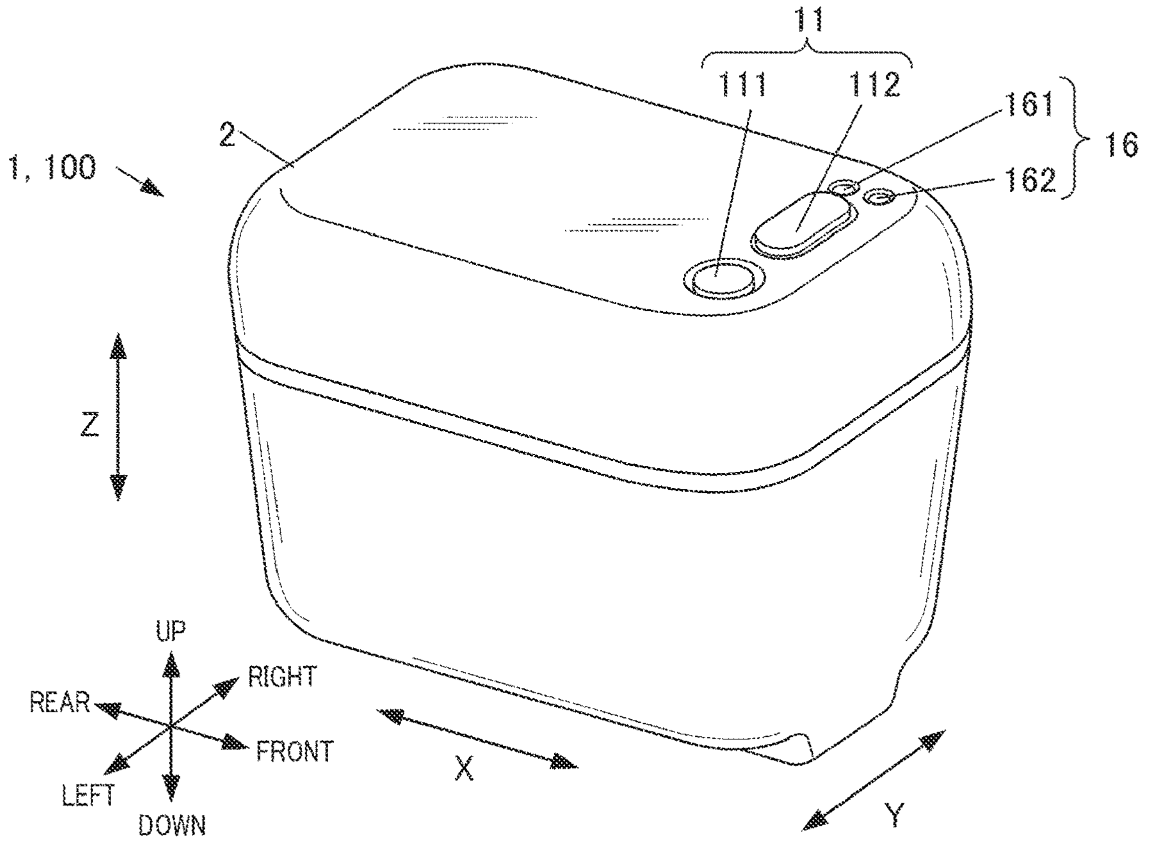
FIG. 1 is a perspective view of a main portion showing an external configuration of an apparatus main body of a printing apparatus according to the present embodiment.
Figure 2:
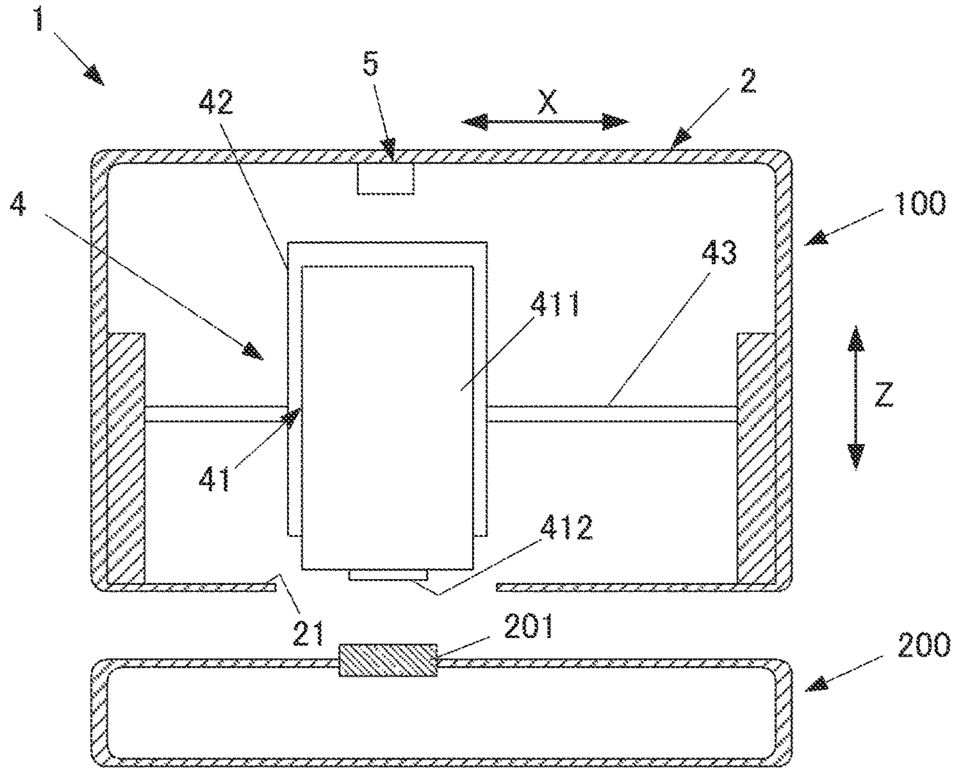
FIG. 2 is a cross-sectional view of the main portion at a vertical surface in a front-rear direction of the printing apparatus according to the present embodiment and is a schematic diagram showing an inner configuration of the main portion of the printing apparatus.

FIG. 1 is a perspective view showing an external configuration of a main portion of a printing apparatus (apparatus main body) according to the present embodiment. FIG. 2 is a cross-sectional view schematically showing the main portion of the printing apparatus shown in FIG. 1.

In the embodiments described below, up, down, left, right, front, and rear are directions as shown in FIG. 1. Moreover, X-direction, Y-direction, and Z-direction are directions as shown in the diagrams.

Figure 3:
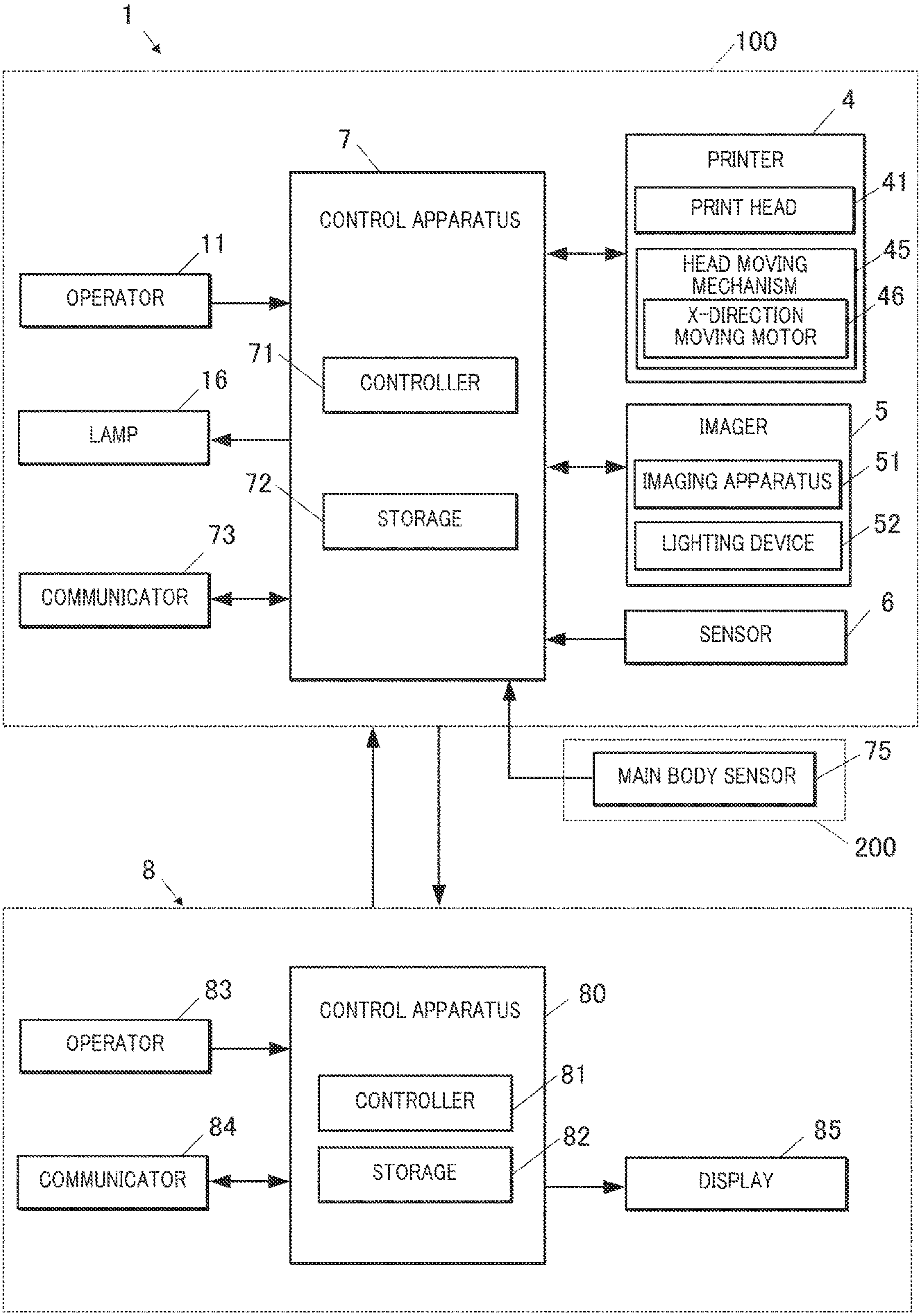
FIG. 3 is a block diagram of a main portion showing a control configuration of a printing apparatus according to the present embodiment and a terminal apparatus linked with the printing apparatus.

According to the present embodiment, the printing apparatus 1 is linked with a terminal apparatus which is an external apparatus so as to be operated linked with the terminal apparatus. FIG. 3 is a block diagram of the main portion showing the functional configuration of the printing apparatus and the terminal apparatus linked with the printing apparatus.

The printing apparatus 1 (later described apparatus main body 100) according to the present embodiment is a hand held printing apparatus (applying apparatus) that is formed in a size that can be held with one hand (see FIG. 6A to FIG. 6C) and that can be used while being held in the hand.

For example, in the printing apparatus 1, a skin surface of a human is to be a printing target (applying target), and liquid 3 in a color such as a skin color (cosmetic ink, see FIG. 4A to FIG. 4D) is applied (printed) on the skin surface. The printing apparatus 1 is used by the user bringing the apparatus above the printing target (applying target). The printing target (applying target) of the printing apparatus 1 according to the present disclosure is not limited to the skin surface of the human. For example, the printing apparatus 1 may apply base ink such as white on a nail.

The printing apparatus 1 shown in FIG. 2 includes an apparatus main body 100, and a stand (mounting section) 200 in which the apparatus main body 100 is mounted when not in use (not printing) (see FIG. 2).

A cap mechanism 201, etc. that covers and protects a discharging portion (discharging surface) 412 of a later-described print head 41 is provided in the stand 200, and the apparatus main body 100 of the printing apparatus 1 is recommended to be mounted on the stand 200 when not in use (not printing).

A main body sensor 75 (see FIG. 3) that detects whether the apparatus main body 100 is mounted is provided in the stand 200.

For example, the main body sensor 75 includes a contact sensor, a pressure sensor, and the like. The configuration of the main body sensor 75 is not limited as long as it is possible to detect the presence of the apparatus main body 100 on the stand 200.

As shown in FIG. 1, etc., the printing apparatus 1 (apparatus main body 100) includes a case 2 formed in a substantial box shape.

As shown in FIG. 2, on a bottom surface of the case 2, an opening 21 is provided in a position toward the front in the front-rear direction, and in approximately the center in a left-right direction.

The opening 21 is formed in a size so as to be able to expose a later-described discharger 412 of a print head 41 to the outside. The specific shape and size of the opening 21 are not limited.

An operator 11 and various lamps 16 are provided on an upper surface of the case 2.

The operator 11 is where the user performs various inputs, and includes a power supply button 111 and a print button 112. The power supply button 111 is a power supply switch button that turns on and turns off the power of the printing apparatus 1. The print button 112 is an operation button to perform various input such as a print start button to instruct start of printing. For example, when the user presses the power supply button 111, an instruction signal is output to a later-described control apparatus 7 (see FIG. 3) in response to the operation, and the power of the printing apparatus 1 is turned on and off.

The lamp 16 includes a power LED (Light Emitting Diode) 161 and a wireless LAN (Local Area Network) LED 162. The power LED 161 includes an LED as a light source. When the power of the apparatus main body 100 is on, the LED is turned on, and when the power of the apparatus main body 100 is turned off, the LED is turned off. As described later, the power LED 161 may be lit according to agitating information. The wireless LAN LED 162 includes an LED as a light source. The LED is turned on in a state during the connection for communication by wireless LAN communication between the apparatus main body 100 and a later-described terminal apparatus 8, and the LED is turned off in a state when there is no connection for communication by wireless LAN communication.

The lamp 16 according to the present embodiment also functions as a notifier that makes various notifications to the user.

For example, the lamp 16 can be lit in various colors or may blink in various patterns. Depending on the color lit and the type of blinking, various information may be notified to the user.

For example, when agitating information (that is, "dispersion information" showing an operation to disperse the liquid 3 in a tank 411) (see FIG. 4A to FIG. 4D) of the liquid 3 in the tank 411 shows a light dissolution operation within a short amount of time ("agitating operation" or simply "agitating" according to the present embodiment) is enough, the power LED 161 blinks in an interval of 0.5 seconds. When intense agitating operation needs to be performed for a long amount of time, the "agitating information" as the dispersion information is notified by a blinking pattern such as the power LED 161 blinking in an interval of 0.1 seconds, for example.

Further, when the agitating operation is performed, the power LED 161 notifies to the user the operation instruction (instruction contents) related to agitating according to the status of the agitating. For example, when the agitating is not enough, the power LED 161 continues to blink. When the agitating is performed excessively, and the agitating operation should be stopped immediately, the blinking of the power LED 161 stops (the power LED 161 continues to be a lit state).

Instead of the power LED 161 or together with the power LED 161, an indicator or a display (not shown) can be provided, and in this case, the indicator or the display may function as the notifier.

Alternatively, instead of the power LED 161, the pattern to light the wireless LAN LED 162 may be changed according to the agitating information, or the lighting pattern of the power LED 161 and the wireless LAN LED 162 may be combined according to the agitating information.

The color of the LED in the power LED 161 and the wireless LAN LED 162 may be the same or may be different. When the color of the LED is different, either one may be lit (blink) according to the agitating information. The power LED 161 and the wireless LAN LED 162 may be a single color LED or may be a multi-color LED.

The shape of each unit of the case 2, and the number and position of the operator 11 and the lamp 16 is not limited to the illustrated example. For example, the operator 11 and the lamp 16 may be provided on a side surface of the case 2.

A printer 4, an imager 5, and the like are provided in the case 2.

The printer 4 includes a print head 41 and a head moving mechanism 45 (see FIG. 3) to move the print head 41 in a front-rear direction (X-direction in FIG. 1 and FIG. 2) of the apparatus.

The print head 41 performs printing on the printing target (skin surface according to the present embodiment).

As the print head 41, a cartridge integrated print head is assumed. The print head 41 includes the tank 411 that stores the liquid 3 (cosmetic ink in a color of the skin according to the present embodiment) and the discharger 412 (discharging surface in which nozzles which are not shown are provided) that discharges the liquid 3 (ink).

The discharger 412 is provided on a lower surface of the print head 41 (surface facing the skin surface which is the printing target) and the discharger 412 is normally exposed downward from the opening 21 of the case 2.

The print head 41 is not limited to a configuration in which the tank 411 and the discharger 412 (discharging mechanism portion) are formed as one. For example, the tank 411 may be configured separately from the discharger 412 (discharging mechanism portion) that discharges the liquid 3, and the tank 411 may be connected to the discharger 412 (discharging mechanism portion) through the supplying tube, etc. when the printing is performed.

The print head 41 according to the present embodiment is an inkjet head that performs printing by an inkjet method by spraying fine droplets of liquid 3 (ink) to the printing target (skin surface) from the discharger 412.

The liquid 3 (see FIG. 4A to FIG. 4D) according to the present embodiment is a mixture in which various solutes 32 are dissolved in a solvent 31.

The liquid 3 is cosmetic ink in which the solvent 31 is water and the solute 32 is titanium dioxide, and the color of the liquid is a color of the skin. The plurality of types of print heads 41 are prepared with tanks 411 storing liquids 3 with various colors or with different proportions of the solute 32. In this case, the print head 41 used in the printing is chosen according to the preferences of the user and the selected print head 41 is mounted on the printing apparatus 1.

The liquid 3 is described in detail later.

The print head 41 (tank 411 of the print head 41) is supported by an X-direction moving stage that moves (scans) a carriage 42 in an X-direction (front-rear direction of apparatus) in a state mounted (held) in the carriage 42 as the holder.

The head moving mechanism 45 (see FIG. 3) includes an X-direction moving motor 46 (see FIG. 3) as a driver that suitably moves the print head 41 (carriage 42) in the X-direction. By driving the X-direction moving motor 46, the print head 41 mounted on the carriage 42 is moved in the X-direction along an X-direction guide 43 provided in the X-direction moving stage.

The imager 5 images the printing target (the surface of the skin according to the present embodiment) and includes an imaging apparatus 51 and a lighting device 52.

As shown in FIG. 2, the imager 5 is positioned above the opening 21 in the case 2. The lighting device 52 illuminates the printing target and the printing target is imaged by the imaging apparatus 51 from the opening 21. With this, the image of the printing target is obtained.

For example, the imaging apparatus 51 is a small camera including a solid photographic element such as a charge coupled device (CCD) or a complementary metal oxide semiconductor (CMOS) including 2 million pixels or more and a lens. The lighting device 52 is an illuminating lamp such as a white LED.

In addition to the above, the printing apparatus 1 includes a communicator 73.

The communicator 73 is able to transmit and receive information between a later-described terminal apparatus 8 that operates linked with the printing apparatus 1.

The communication between the printing apparatus 1 and the terminal apparatus 8 is performed by wireless LAN, for example. The communication between the printing apparatus 1 and the terminal apparatus 8 is not limited to the above, and various methods can be performed. For example, communication can be performed by using a network line such as the internet or wireless communication based on short range wireless communication standards such as Bluetooth (registered trademark) or Wi-Fi. The communication is not limited to wireless communication and transmitting and receiving of various data can be performed between devices by wired communication. The communicator 73 includes an antenna chip corresponding to a communication method of the terminal apparatus 8.

A sensor 6 is provided in the printing apparatus 1 (apparatus main body 100) according to the present embodiment.

The sensor 6 includes an acceleration sensor or a 6-axis sensor combining an acceleration sensor and a gyro sensor so as to be able to detect mechanical motion (movement) such as moving direction (for example, front-rear, left-right, up-down) or moving speed (acceleration) of the printing apparatus 1 (apparatus main body 100). The gyro sensor is used to detect the direction, tilt and rotation (angular velocity) of the printing apparatus 1. By combining with the acceleration sensor, even the slight motion (movement) of the printing apparatus 1 and the tank 411 can be detected.

When the printing apparatus 1 is used for printing, the printing apparatus 1 (apparatus main body 100) makes a motion (movement, hereinafter also referred to as "vibration") in some degree. On the other hand, when the printing apparatus 1 is not used and is placed in a state on the stand 200 or on the desk, vibration hardly occurs. The sensor 6 detects whether there is such vibration (movement) that occurs in the printing apparatus 1 (apparatus main body 100).

According to the present embodiment, it is assumed that the user shakes the apparatus main body 100 of the printing apparatus 1 held in the hand, and the sensor 6 detects the state of how (how much) and the direction that the printing apparatus 1 (apparatus main body 100) is shaken.

The sensor 6 is to be able to detect the vibration (motion, movement) of the printing apparatus 1 (apparatus main body 100), and the specific configuration and the placed position are not limited.

The printing apparatus 1 includes the control apparatus 7.

The control apparatus 7 is a computer that includes a controller 71 that includes at least one processor such as a CPU (Central Processing Unit), a storage 72 that includes a ROM (Read Only Memory), RAM (Random Access Memory), etc. (all not shown).

A portion or the entire storage 72 may be a separate configuration and may be provided outside the control apparatus 7.

The storage 72 stores various programs to operate the printing apparatus 1 (for example, program to perform the printing process) and various data. The controller 71 deploys the programs in the work area of the RAM, for example. The controller 71 executes the program and with this, the units of the printing apparatus 1 are centrally controlled.

According to the present embodiment, the controller 71 controls the printer 4 and performs the printing operation. The controller 71 controls the imager 5 and images the printing target etc. The controller 71 also functions as a static condition time obtainer, an information outputter, and agitating status obtainer. Such functions of the controller 71 are realized by the CPU of the controller 71 in coordination with the program stored in the ROM of the storage 72.

The controller 71 as the static condition time obtainer obtains "static condition time" of the tank 411.

The above-described detection result detected by the sensor 6 and the main body sensor 75 is output to the controller 71. The controller 71 measures the "static condition time" of the tank 411 based on the information of the motion ("vibration", movement of the printing apparatus 1 including the tank 411) detected by the sensor 6, and the detection result detected by the main body sensor 75.

Here, the "static condition" is a state in which there is hardly any motion (movement, vibration). Specifically, this is a state in which the printing apparatus 1 (apparatus main body 100) is placed somewhere such as on the stand 200 or a desk and the motion (movement, vibration) of the tank 411 detected by the sensor 6 becomes a predetermined threshold or smaller, or the apparatus main body 100 of the printing apparatus 1 is placed on the stand 200 and this is detected by the main body sensor 75. The predetermined threshold of the motion (movement, vibration) is suitably set and this is a value in which the surface of the liquid (liquid 3 in the tank 411) hardly shakes, for example.

The "static condition time" is the amount of time that the "static condition" continues.

The controller 71 includes a timer function, and counts the time that elapsed after the tank 411 became the "static condition".

Specifically, when the motion (movement, vibration) of the tank 411 (printing apparatus 1 including the tank 411) detected by the sensor 6 is equal to or less than the predetermined threshold or the main body sensor 75 detects that the apparatus main body of the printing apparatus 1 is placed on the stand, the controller 71 starts the timer and starts counting the "static condition time".

Then, the controller 71 stops the timer when the sensor 6 detects the motion (movement, vibration) that exceeds the predetermined threshold and determines the "static condition time".

The timer may be stopped when the main body sensor 75 detects that the apparatus main body 100 is removed from the stand 200, but the apparatus main body 100 may be left on the desk as is even after being removed from the stand 200. Therefore, it is preferable that the timer is stopped when the sensor 6 detects the motion (movement, vibration) that exceeds the predetermined threshold in order to detect the end of the "static condition" more accurately. Moreover, the timer may be stopped when the sensor 6 detects the motion (movement, vibration) that exceeds the predetermined threshold for a certain amount of time determined in advance (for example, about 1 to 2 seconds).

The timer function of the controller 71 is configured so that the counting (that is, measuring of the static condition) may continue by a small amount of power supply from the power source (for example, battery, etc., not shown) after the power is turned off in order to reflect the static condition time even after the power is turned off.

The timer function of the controller 71 may start measuring the static condition as soon as the power is turned off, and the duration of such measurement can be stored in the storage 72 including the nonvolatile memory.

The controller 71 functions as the information outputter that outputs the "agitating information (dispersion information)" of the liquid 3 in the tank 411 based on at least the "static condition time".

Here, the "agitating information" includes at least one of the following, method of agitating operation (dispersion operation) to agitate the liquid 3 in the tank 411 by vibrating the tank 411 (that is, type of operation pattern (see FIG. 6A to FIG. 6C) and combination), number of times of the agitating operation, and duration of the agitating operation.

The destination of output of the "agitating information" output by the controller 71 as the information outputter may be a notifier provided in the printing apparatus 1 such as the lamp 16, etc. or the display 85, etc. of the terminal apparatus 8.

By outputting the "agitating information" to the notifier such as the lamp 16 and the display 85, the user is able to know which operation should be performed to what extent in order to agitate the liquid 3 in the present tank 411 to be a suitable state for use.

The liquid 3 in the tank 411 is a mixture in which various solutes 32 are dissolved in the solvent 31 as described above. The solute 32 such as titanium dioxide has a larger specific gravity than the solvent 31 such as water. When the liquid 3 is left to be a "static condition" (that is, the vibration is not applied to the tank 411 storing the liquid 3), the solvent 31 and the solute 32 are gradually separated. Then, the solute 32 settles at the bottom of the tank 411.

FIG. 4A to FIG. 4D schematically show the liquid 3 in the tank 411. In FIG. 4A to FIG. 4D, "≅", "<", ">" show the relation of greater or less in the ratio of the content of the solvent 31 and the solute 32 included in each layer.

Figure 4D:
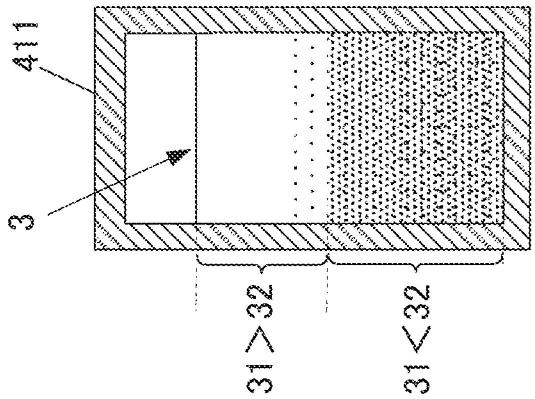
FIG. 4D is a cross-sectional view of the tank schematically showing a state of the liquid in the tank, and shows a state in which the separation of the liquid in the tank is gradually progressing.
Figure 4C:
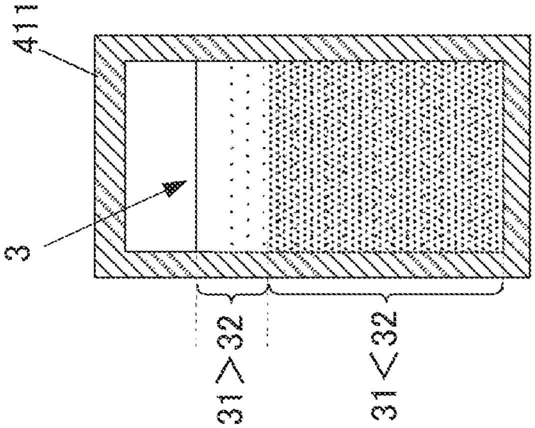
FIG. 4C is a cross-sectional view of the tank schematically showing a state of the liquid in the tank, and shows a state in which the separation of the liquid in the tank is gradually progressing.
Figure 4B:
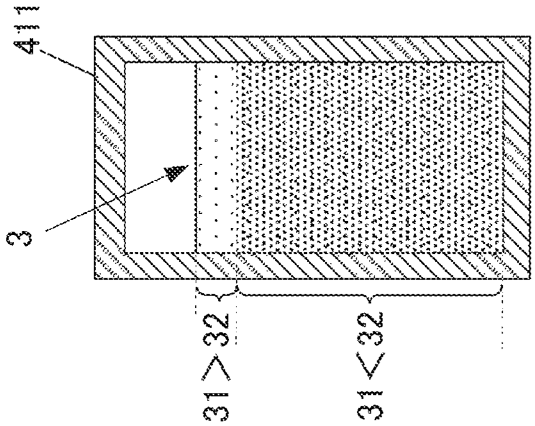
FIG. 4B is a cross-sectional view of a tank schematically showing a state of the liquid in the tank, and shows a state in which separation of the liquid in the tank is gradually progressing.
Figure 4A:
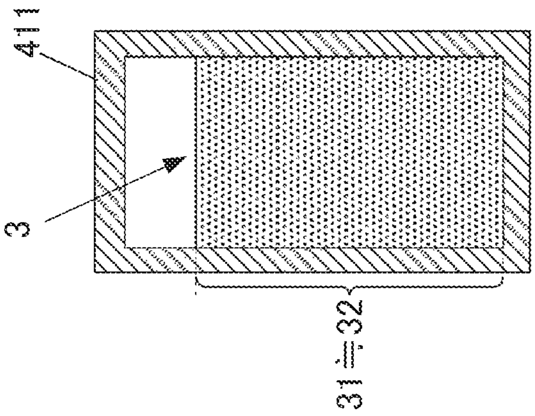
FIG. 4A is a cross-sectional view of a tank schematically showing a state of a liquid in the tank, and shows a uniformly agitated state.

FIG. 4A is a state in which the liquid 3 is agitated and the solvent 31 and the solute 32 are agitated evenly (the solute 32 is dispersed in the solvent 31, shown in the drawing as "31≅32"). Preferably, the liquid 3 is used in which the entire liquid is agitated evenly.

In contrast, FIG. 4B to FIG. 4D show the separation of the solvent 31 and the solute 32 and the sedimentation of the solute 32 gradually progressing when the tank 411 is in the "static condition". In other words, the layers separate as time passes to the layer mainly including the solvent 31 (that is, layer shown with "31>32" in FIG. 4B to FIG. 4D), and the layer mainly including the solute 32 (that is, layer shown with "31<32" in FIG. 4B to FIG. 4D).

Figure 5:
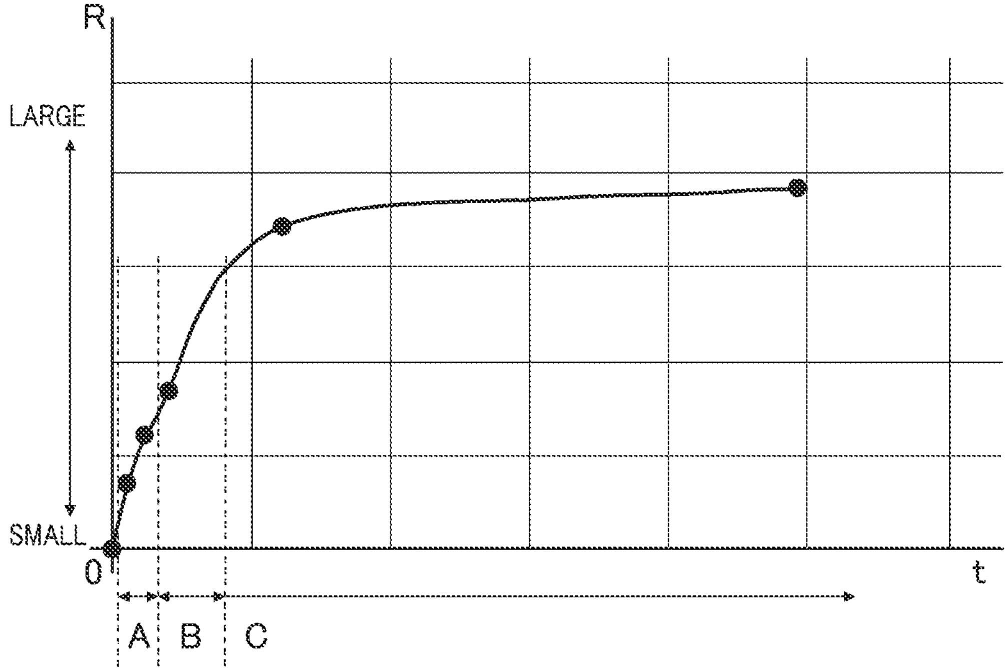
FIG. 5 is a graph showing a trend between static condition time in the tank and the separation of liquid in the tank.

FIG. 5 is a graph in which the horizontal axis shows the time that elapsed, and the vertical axis shows the degree of separation between the solvent 31 and the solute 32 (ratio R (%) of the separated solvent 31). The graph shows the tendency of the separation between the solvent 31 and the solute 32 as time passes. The ratio of the separated solvent 31 here is the ratio showing the volume of the layer mainly including the solvent 31 with relation to the entire volume of the liquid.

As shown in FIG. 5, immediately after the liquid 3 is agitated (that is, elapsed time 0 seconds), the ratio of the separated solvent 31 is about 0%. FIG. 5 shows the following tendency. As time passes, the separation between the solvent 31 and the solute 32 progresses, and the ratio of the separated solvent 31 increases. Moreover, after a certain amount of time passes, the degree of separation hardly changes (becomes the state in which the solvent 31 and the solute 32 are substantially completely separated).

FIG. 4B schematically shows a state in which the liquid 3 applies to a range "A" in the graph shown in FIG. 5, for example. In this case, some separation between the solvent 31 and the solute 32 and sedimentation of the solute 32 can be seen but the degree of separation and sedimentation is minor.

FIG. 4C schematically shows a state in which the liquid 3 applies to a range "B" in the graph shown in FIG. 5, for example. In this state, the separation between the solvent 31 and the solute 32, and the sedimentation of the solute 32 is more progressed than the range "A".

FIG. 4D schematically shows the state in which the liquid 3 applies to the range "C" in the graph shown in FIG. 5, for example. In this state, the solvent 31 and the solute 32 are substantially separated, and the solute 32 is settled at the bottom of the tank 411.

The level of the separation and sedimentation of the liquid 3 in the tank 411 becomes for a certain amount of time that the tank 411 is placed in the "static condition" (that is, the length of the "static condition time") differs depending on the type of liquid 3 (for example, type of solvent 31, type of solute 32 agitated in the solvent 31 (particle size and viscosity of the solute 32) and the blending ratio of the above).

The level of separation and the settlement in the liquid 3 can be predicted to some extent from the type of liquid 3 and "static condition time" using the "Stokes' Formula".

Therefore, according to the present embodiment, the controller 71 as the information outputter outputs the "agitating information" also considering the information regarding the liquid 3 (type of liquid 3) in addition to the "static condition time".

At the start of the static condition, the state of the ink is not always the state as shown in FIG. 4A. Therefore, in this case also, the "agitating information" is output showing the remaining degree of the agitating operation that should be performed based on the result detected by the sensor 6 which is the 6-axis sensor, etc.

The specific method that the controller 71 derives the "agitating information" is not limited. For example, the correspondence of the "static condition time" (duration of "static condition") with relation to the degree of separation of the solvent 31 and the solute 32 and the sedimentation of the solute 32 (that is, relation as shown in the graph in FIG. 5) according to the liquid 3 used in the printing apparatus 1 (according to each liquid 3 when a plurality of printing heads 41 storing different types of liquids 3 are prepared) may be stored in advance in the storage 72, etc. of the control apparatus 7.

Moreover, it is possible to predict in advance the "agitating operation" that should be performed in order to solve the state of separation and sedimentation according to the degree of the separation and sedimentation level of the liquid 3.

According to the present embodiment, the storage 72 of the control apparatus 7 may store in advance the relation between the degree of separation and sedimentation in the liquid 3 and the contents of the "agitating operation" necessary to agitate the liquid 3 so that the contents are dispersed again to return to the state shown in FIG. 4A again.

Figure 6A:
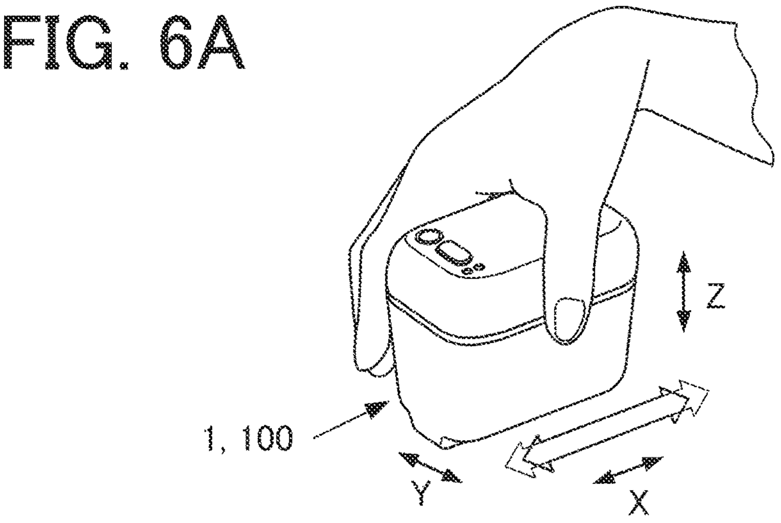
FIG. 6A is a diagram showing an operation pattern example of an agitating operation.
Figure 6B:
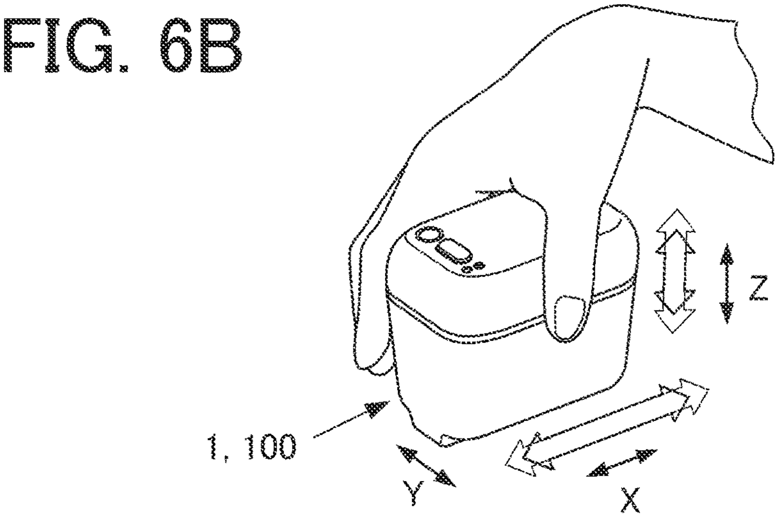
FIG. 6B is a diagram showing an operation pattern example of an agitating operation.
Figure 6C:
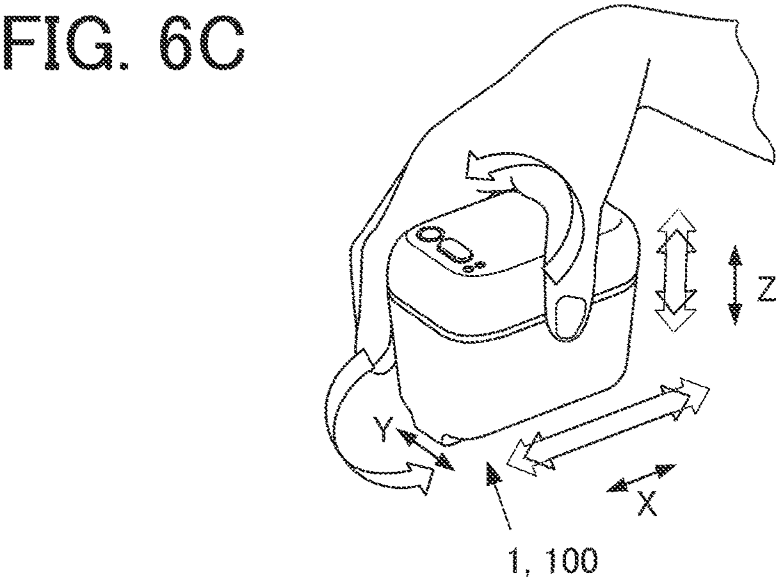
FIG. 6C is a diagram showing an operation pattern example of an agitating operation.

FIG. 6A, FIG. 6B, and FIG. 6C show the example of the operation patterns of the "agitating operation".

For example, FIG. 6A shows an operation to shake the apparatus main body 100 of the printing apparatus 1 held in the hand in the front-rear direction (X-direction in drawing) (hereinafter referred to as "first operation").

In addition to the "first operation" shown in FIG. 6A, FIG. 6B shows the operation to shake the apparatus main body 100 in the up-down direction (Z-direction in drawing) (hereinafter referred to as "second operation").

In addition to the "first operation" shown in FIG. 6A and the "second operation" shown in FIG. 6B, FIG. 6C shows the operation to rotate the apparatus main body 100 in the left-right direction (Y-direction in drawing) (hereinafter referred to as "third operation").

According to the present embodiment, the controller 71 as the information outputter 71 outputs as the "agitating information" the information showing the combination of the type of the operation, the number of times the operation is performed and the amount of time the operation is performed. Specifically, the information shows the number of times that each operation among the "first operation" to the "third operation" is repeated (or the amount of time the operation is performed).

The swing width and the speed (operation speed) of the "first operation" to the "third operation" apply influence to the effect of the agitating. Therefore, the "agitating information" may include the information regarding the swing width of each operation and the speed that the operation is performed. That is, the "agitating information" may be output as information showing a combination between the method (type) of operation as shown in the "first operation" to the "third operation" and at least one of the following, the number of times the operation is performed, the duration of the operation, the swing width of the operation, and the speed of the operation.

The operation patterns of the "agitating operation" are not limited to the illustrated examples. For example, in addition to the above, there may be an operation to shake the apparatus main body 100 in the left-right direction (Y-direction in drawing).

It is suitably set which operation among the "first operation" to the "third operation" is repeated how many times each. For example, the operation pattern may be to only perform the "third operation", and the number of times that the operation is repeated may be changed depending on the degree of separation and sedimentation in the liquid 3.

Alternatively, depending on the type of liquid 3, the amount stored in the tank 411, and the shape of the tank 411, when there is a more effective operation of agitating, it is possible to perform the appropriate operation among the "first operation" to the "third operation" depending on the type and amount of the liquid 3, and the shape of the tank 411.

For example, when there is a relation that when the tank 411 that stores the liquid 3 that is the type α is placed in the static condition for 1 hour or more and less than 10 hours, the liquid 3 in the tank 411 becomes the separation and sedimentation state (for example, state shown in FIG. 4B) in the level "A" shown in the graph in FIG. 5, when the detection information showing that the "tank 411 storing the liquid 3 that is the type α is placed in the static state for 4 hours" is provided to the controller 71, the controller 71 as the information outputter outputs the following.

That is, first, the controller 71 derives from the storage 72 the "agitating information" showing the type of agitating operation that is necessary to agitate the liquid 3 in the separation and sedimentation state in the level "A" to become the normal state that can be used (even state as shown in FIG. 4A).

Then, in this case, when "it is necessary to apply the motion (movement, vibration) on the tank 411 by shaking the printing apparatus 1 (apparatus main body 100) about 5 times in the front-rear direction", as the "agitating information", the lamp 16 and/or the display 85 output a display or the like showing that the "printing apparatus 1 (apparatus main body 100) should be shaken about 5 times in the front-rear direction" (that is, perform the agitating operation as shown in FIG. 6A). With this, the "agitating information" is notified to the user.

For example, when there is a relation that when the tank 411 that stores the liquid 3 that is the type α is placed in the static condition for 10 hours or more and less than 24 hours, the liquid 3 in the tank 411 becomes the separation and sedimentation state (for example, state shown in FIG. 4C) in the level "B" shown in the graph in FIG. 5, when the detection information showing that the "tank 411 storing the liquid 3 that is the type α is placed in the static state for 15 hours" is provided to the controller 71, the controller 71 as the information outputter outputs the following.

That is, first, the controller 71 derives from the storage 72 the "agitating information" showing the type of agitating operation that is necessary to agitate the liquid 3 in the separation and sedimentation state in the level "B" to become the normal state that can be used (even state as shown in FIG. 4A).

Then, in this case, when "it is necessary to apply the motion (movement, vibration) on the tank 411 by shaking the printing apparatus 1 (apparatus main body 100) about 5 times in the front-rear direction and about 5 times in the up-down direction", as the "agitating information", the lamp 16 and/or the display 85 output a display or the like showing that the "printing apparatus 1 (apparatus main body 100) should be shaken about 5 times in the front-rear direction and about 5 times in the up-down direction" (that is, perform the agitating operation as shown in FIG. 6B). With this, the "agitating information" is notified to the user.

For example, when there is a relation that when the tank 411 that stores the liquid 3 that is the type α is placed in the static condition for 24 hours or more the liquid 3 in the tank 411 becomes the separation and sedimentation state (for example, state shown in FIG. 4D) in the level "C" shown in the graph in FIG. 5, when the detection information showing that the "tank 411 storing the liquid 3 that is the type α is placed in the static state for 72 hours" is provided to the controller 71, the controller 71 as the information outputter outputs the following.

That is, first, the controller 71 derives from the storage 72 the "agitating information" showing the type of agitating operation that is necessary to agitate the liquid 3 in the separation and sedimentation state in the level "C" to become the normal state that can be used (even state as shown in FIG. 4A).

Then, in this case, when "it is necessary to apply the motion (movement, vibration) on the tank 411 by shaking the printing apparatus 1 (apparatus main body 100) about 5 times in the front-rear direction, and about 5 times in the up-down direction, and by rotating about 5 times", as the "agitating information", the lamp 16 and/or the display 85 output a display or the like showing that the "printing apparatus 1 (apparatus main body 100) should be shaken about 5 times in the front-rear direction and about 5 times in the up-down direction and be rotated about 5 times" (that is, perform the agitating operation as shown in FIG. 6C). With this, the "agitating information" is notified to the user.

The levels of the separation and the sedimentation state of the liquid 3 are not limited to 3 levels.

For example, the change in the level of the separation and sedimentation state of the liquid 3 is greatly different between when the "static condition time" is less than 20 hours and when the time is 20 hours or more. When the "static condition time" is 0 hours or more and less than 20 hours, the combination of the "first operation" and the "second operation" as shown in FIG. 6B is performed for 3 sets. When the "static condition time" is 20 hours or more, the combination of the "first operation", the "second operation", and the "third operation" as shown in FIG. 6C is performed for 5 sets. As described above, 2 levels can be set.

Alternatively, the separation and sedimentation state of the liquid 3 can be divided into more detailed levels of 4 or more levels. The combination of the operation pattern (that is, the "first operation", the "second operation", and the "third operation") suitable for each level can be set.

The controller 71 functions as the agitating status obtainer (that is, dispersion status obtainer that obtains "dispersion status") that obtains the "agitating status" based on the information of the motion (movement, vibration) in the agitating operation.

That is, the sensor 6 detects the motion (movement, vibration) in the agitating operation (that is, detects the movement in the dispersion operation) and outputs the "agitating status (dispersion status)" as the detection result to the controller 71.

The "agitating status" shows a situation such as when the agitating operation is insufficient or excessive.

When the agitating operation is insufficient, the sensor detects which operation is insufficient to what extent (degree of swinging width and number of times of operation) among the "first operation" to the "third operation", and outputs the result to the controller 71.

When the agitating operation is excessive is when, for example, the user shakes the printing apparatus 1 (apparatus main body 100) too vigorously. In this case, there is a possibility that the units in the apparatus are damaged or problems are occurring in the units, or the liquid 3 in the tank 411 is agitated too hard so that bubbles are generated.

When the "agitating status" is obtained, the controller 71 as the agitating status obtainer outputs the operation instruction regarding the agitating according to the "agitating status".

Specifically, when the agitating operation is not sufficient, for example, the display showing which operation is to be performed to what extent is output to the lamp 16 and/or the display 85, and the information is notified to the user.

When the agitating operation is excessive, for example, a display meaning that the agitating operation should be stopped immediately is output to the lamp 16 and/or display 85, and the information is notified to the user.

The printing apparatus 1 according to the present embodiment is linked with an external device such as a terminal apparatus 8, etc., and operates according to the instruction input from the terminal apparatus 8, etc.

The terminal apparatus 8 is assumed to be a portable terminal apparatus such as a smartphone or tablet, but is not limited to the above. The terminal apparatus 8 is not limited and may be any apparatus that can communicate with the printing apparatus 1, and may be a personal computer such as a laptop type or a stationary type or a terminal apparatus for a game.

Specifically, the terminal apparatus 8 includes an operator 83, a communicator 84, a display 85, a control apparatus 80, and the like.

The operator 83 is configured so that various input and setting can be performed according to the operation by the user. When the operator 83 is operated, the input signal corresponding to the operation is transmitted to the control apparatus 80. The touch panel is provided as one on the surface of the display 85 according to the present embodiment. The user is able to perform operation such as various input and setting by touch operation on the touch panel.

The operator 83 in which the operation such as various input and setting is performed is not limited to the touch panel. For example, various operation buttons, a keyboard, and a pointing device can be provided as the operator 83.

Various input and setting may be performed on the printing apparatus 1 by operating the operator 83. For example, the user may be able to start the printing operation of the printing apparatus 1 by operating the operator 83.

The communicator 84 performs communication with the communicator 73 of the printing apparatus 1. For example, data such as various images is received when the data is transmitted from the printing apparatus 1. The communicator 84 includes a wireless communication module so as to be able to communicate with the communicator 73 of the printing apparatus 1.

The communicator 84 is to be any device that can perform communication with the printing apparatus 1, and a device which matches with the communication standard of the communicator 73 of the printing apparatus 1 is applied.

The display 85 includes a liquid crystal display (LCD), an organic electroluminescent display, or other flat display.

For example, the image transmitted from the printing apparatus 1 can be displayed on the display 85 according to the present embodiment.

As described above, a touch panel may be formed as one with the surface of the display 85 in order to perform various input. In this case, the touch panel functions as the operator 83.

The display 85 is configured to be capable of displaying various guiding screens, warning display screens, etc., under the control of the controller 81. As the notifier of the printing apparatus 1, the display 85 may display the "agitating information", various "operation instruction" based on the status of the agitating operation (agitating status) (operation instruction related to the agitating) and may notify the contents to the user.

When the imaging apparatus 51 is able to image a moving image that can be displayed as a live moving image, the display 85 may display the moving image imaged by the imaging apparatus 51 live as necessary.

The control apparatus 80 is a computer that includes a controller 81 including a CPU (Central Processing Unit) (not shown), etc., and a storage 82 including a ROM (Read Only Memory), and a RAM (Random Access Memory), etc. (not shown).

The storage 82 stores various programs and various data in order to operate the units of the terminal apparatus 8.

Specifically, in addition to the operation program to centrally control the units of the terminal apparatus 8, the ROM, etc. according to the present embodiment stores various programs (not shown) such as a print processing application program to perform the print process using the printing apparatus 1. The control apparatus 80 deploys the above programs in the work area of the RAM, for example, and executes the above programs. With this, the control apparatus 80 controls the terminal apparatus 8.

The controller 81 centrally controls the operation of each unit of the terminal apparatus 8. In coordination with the program stored in the storage 82 (print processing application program, etc.), the controller 81 executes various functions to enable the printing apparatus 1 to perform printing on the printing target (skin surface).

Figure 7:
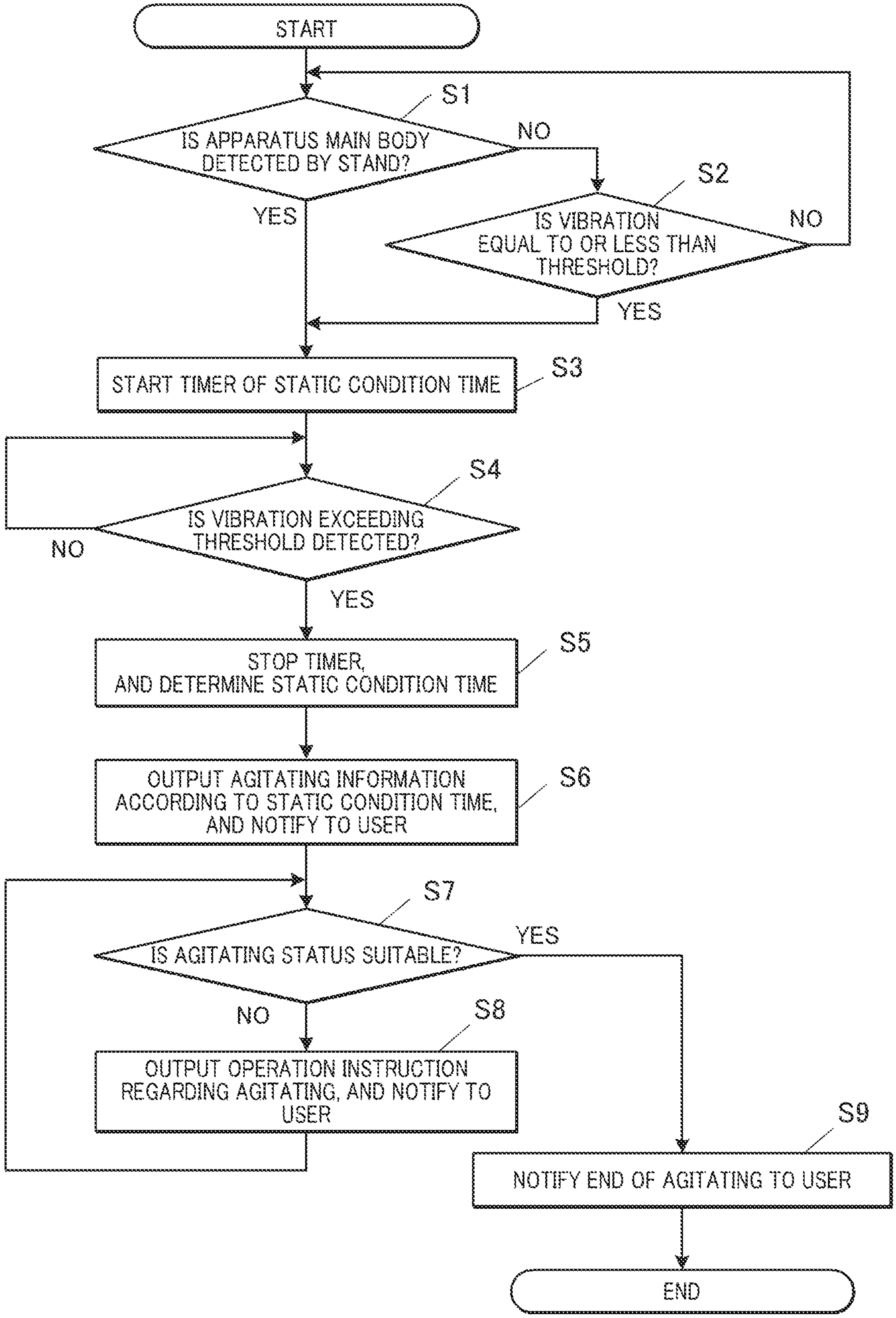
FIG. 7 is a flowchart showing an agitating process according to the present embodiment.

With reference to FIG. 7, the agitating method as the liquid dispersion method in order to disperse the liquid 3 according to the present embodiment is described.

According to the present embodiment, when the printing is performed using the printing apparatus 1, the user holds the printing apparatus 1 (apparatus main body 100) in the hand and moves the printing apparatus 1 on the surface of the skin of the person (for example, a surface of a face such as a cheek, forehead, etc.) who is the printing target while performing the printing operation.

Specifically, the controller 71 controls the imaging apparatus 51 and the lighting device 52 of the imager 5, and the imaging apparatus 51 images the image of the skin surface which is the printing target. The image data obtained by the imager 5 is transmitted to the terminal apparatus 8 through the communicator 73.

In the terminal apparatus 8, the controller 81 analyzes the image data received from the printing apparatus 1, detects the portion where there is a deviation in the density of the color on the skin surface (for example, a portion where there is a blemish), and generates print data to perform printing in this portion.

The generated print data is transmitted to the printing apparatus 1 through the communicator 84.

In the printing apparatus 1, the controller 71 outputs the control signal to the printer 4 based on the print data received from the terminal apparatus 8, and controls the X-direction moving motor 46 and the print head 41 of the printer 4 so as to print on the corresponding portion of the surface of the skin according to the print data.

When the printing operation of the printer 4 ends, as shown in FIG. 7, the controller 71 determines whether the apparatus main body 100 is detected by the stand 200 (step S1). According to the present embodiment, the main body sensor 75 provided in the stand 200 determines whether the apparatus main body 100 being placed on the stand 200 is detected.

According to the present embodiment, after the printing operation ends, it is recommended to place the apparatus main body 100 on the stand 200 in order to protect the discharger 412. Therefore, when it is not possible to detect that the apparatus main body 100 is placed on the stand 200 even after the printing based on the print data ended, the apparatus may be configured to display a message on the display 85 to urge the user to place the apparatus main body 100 on the stand 200.

The detection result is output as necessary from the sensor 6 to the controller 71.

When the apparatus main body 100 is not detected by the stand 200 (step S1; NO), the controller 71 determines whether the motion (movement, vibration) detected by the sensor 6 is equal to or less than a predetermined threshold (step S2).

When the vibration is not equal to or less than the threshold (step S2; NO), the controller 71 returns to step S1 and repeats the judgement.

When the apparatus main body 100 is detected by the stand 200 (step S1; YES), or when the vibration detected by the sensor 6 is equal to or less than the threshold (step S2; YES), the controller 71 determines that the tank 411 of the printing apparatus 1 (apparatus main body 100) is in the "static condition" and starts the timer to count the "static condition time" (step S3).

The controller 71 determines as necessary whether the vibration exceeding the predetermined threshold is detected by the sensor 6 (step S4) and repeats the judgement in step S4 until the vibration detected by the sensor 6 exceeds the threshold.

When the vibration detected by the sensor 6 exceeds the predetermined threshold (step S4; YES), the controller 71 stops the timer and determines the "static condition time" (step S5).

Then, the "agitating information" according to the "static condition time" is output and the contents are notified to the user (step S6). According to the present embodiment, the controller 71 sets the "agitating information" considering the type of liquid 3 in addition to the "static condition time". The type of liquid 3 may be set by the user or may be automatically obtained by the apparatus by reading the information of the print head 41 or the tank 411.

When the user sets the type of liquid 3, the user uses the operator 11 or the operator 83 of the terminal apparatus 8 to set the type of liquid 3 to be stored in the tank 411 of the print head 41 set in the printing apparatus 1 (apparatus main body 100).

When the apparatus automatically obtains the information of the type of liquid 3, for example, various barcodes are attached to the print head 41, and when the print head 41 is set in the printing apparatus 1 (apparatus main body 100), the barcode is read. With this, the apparatus understands what type of liquid 3 is stored in the tank 411 included in the print head 41.

Then, the controller 71 sets and outputs the "agitating information" considering the "static condition time" and the type of liquid 3 so that the agitating of the liquid 3 is performed suitably.

Specifically, for example, when the liquid 3 largely includes the solute 32 which is considerably heavier in specific gravity than the solvent 31 (type β of the liquid 3), the separation and sedimentation tend to progress. Therefore, even if the "static condition time" is about 2 hours, for example, the contents combining the "first operation" and the "second operation" to be "shake about 3 times in the front-rear direction and shake about 3 times in the up-down direction" is to be the "agitating information". Such contents are output to the lamp 16 and the display 85 of the terminal apparatus 8 so as to notify to the user what kind of agitating operation should be performed. When notification is made by the lamp 16, the lighting pattern corresponding to the agitating information should be notified to the user in advance on the display 85, etc.

For example, when the liquid 3 includes the solute 32 which is slightly heavier in specific gravity than the solvent 31, and the liquid 3 is a liquid in which the separation and the sedimentation does not progress smoothly even if the liquid 3 is left as is for a while (liquid 3 of the type γ), it is sufficient by performing an agitating operation smaller than the liquid 3 of the type β. Therefore, when the "static condition time" is about 2 hours, for example, the "agitating information" with the contents of the "first operation" which is "to perform the operation to shake about 1 or 2 times in the front-rear direction" is output to the lamp 16 and the display 85 of the terminal apparatus 8. With this, the user is notified of the type of agitating operation that should be performed.

The method of notification is not limited. For example, the notification can be made with the color or type of blinking of the lamp 16, by displaying a description with words on the display 85 of the terminal apparatus 8, and by display of a specific operation shown with pictures or a moving image.

When the printing apparatus 1 or the terminal apparatus 8 includes a sound outputter such as a speaker, the "agitating information" is output to the sound outputter, and the "agitating information" can be notified to the user by a guidance of a voice or a buzzer or an alarm.

When the user starts the agitating operation, the sensor 6 detects the state of the vibration by this operation as necessary, and outputs to the controller 71 the detection result showing the operation contents (that is, the "agitating status") such as how many times the apparatus main body 100 is shaken in which direction.

Based on the detection result of the sensor 6, the controller 71 determines whether the "agitating status" is suitable, that is, whether the operation to shake the printing apparatus 1 (apparatus main body 100) is performed correctly according to the "agitating information" (step S7).

When it is determined that the "agitating status" is not suitable from the detection result of the sensor 6 (step S7; NO), the controller 71 outputs the operation instruction related to the agitating and notifies the contents to the user (step S8). The processes step S7 and after are repeated.

Examples of when the "agitating status" is not suitable includes when the agitating is insufficient or when the agitating is excessive.

For example, when the agitating operation is not performed correctly according to the "agitating information", and the agitating is not enough, the operation that should be further performed is instructed by blinking of the lamp 16 or the display on the display 85.

That is, for example, when the contents of the "agitating information" shows to "shake about 3 times in the front-rear direction and shake about 3 times in the up-down direction", and when the operation contents detected by the sensor 6 is "an operation of shaking 1 time in the front-rear direction and 1 time in the up-down direction is performed", the controller 71 instructs the user to further perform the operation of shaking the apparatus main body 100 2 times in the front-rear direction and 2 times in the up-down direction.

That is, for example, when the agitating operation is not performed suitably according to the "agitating information", for example, when the contents of the "agitating information" shows to "shake about 3 times in the front-rear direction and shake about 3 times in the up-down direction", and when the operation contents detected by the sensor 6 is "an operation of shaking 5 times in the front-rear direction", the controller 71 instructs the user to stop the operation of shaking the apparatus main body 100 in the front-rear direction and to shake the apparatus main body 100 3 times in the up-down direction.

When the shaking (swing width) is too small and sufficient vibration (movement) is not applied to the tank 411, the controller 71 instructs the user to shake the apparatus main body 100 more vigorously.

For example, when the user shakes the apparatus main body 100 more vigorously than the typically assumed situation (the acceleration is too large), similar to when the agitating operation is performed more than the number of times instructed in the "agitating information", when the agitating is excessive, this may cause damage to the printing apparatus 1 (apparatus main body 100) and rattling of the printer 41 (carriage 42, etc.). Further, bubbles may be generated in the liquid in the tank 411 and the liquid may become a state not suitable for printing.

Therefore, when such situation is detected by the sensor 6, the controller 71 immediately instructs to stop the agitating operation.

In contrast, from the detection result of the sensor 6, when it is determined that the "agitating status" is suitable (that is, the agitating operation suitable according to the "agitating information" is performed) (step S7; YES), the controller 71 notifies to the user that the agitating is complete by blinking of the lamp 16 or the display on the display 85 (step S9).

When the agitating ends, the user suitably places the printing apparatus 1 (apparatus main body 100) against the skin surface (printing target) of the face and the process progresses to the printing operation. When the process progresses to the printing operation without suitably performing the agitating, a warning may be notified by the lamp 16 or the display 85, and the printing apparatus 1 may be controlled so that the process cannot progress to the printing operation.

With this, the printing can be performed in a state in which the liquid 3 is evenly mixed in the tank 411, and printing can be performed with a beautiful finish on the printing target such as the skin surface without causing failure in discharge or failure in printing such as uneven coloring.

When there are a plurality of printing target positions on the skin surface, etc. (that is, locations that the user desires to cover by printing such as blemishes), when the printing operation of one location is finished, it is assumed that the user returns the apparatus main body 100 to the stand 200 according to the present embodiment. Therefore, the process is repeated from step S1 in FIG. 7 again each time the printing operation ends in one location. In this case, it is assumed that the "static condition time" becomes very short. When the "static condition time" determined in step S5 is a short amount of time that the separation and sediment of the liquid 3 hardly occurs (that is, 1 hour or less, such as about 20 to 30 minutes), the controller 71 notifies to the user "no agitating operation" as the "agitating information", and it is possible to instruct to progress to the printing operation immediately.

When the printing operation is performed, the apparatus is moved slightly up and down or the apparatus is slightly tilted when the printing apparatus 1 (apparatus main body 100) is placed against the skin surface. With this, some vibration (movement) is applied to the tank 411. When the separation and the sedimentation of the liquid 3 is very slight, the liquid in the tank 411 is agitated with such small amount of vibration and the liquid 3 becomes a state suitable for printing.

The embodiment is not limited to performing the printing one location at a time. For example, the entire printing target (for example, skin surface of face) may be sequentially imaged by the imager 5, and once the printing starts, the deviation of the color may be detected in the printing target location from the imaged image, and the printing of the printing target location may be performed successively.

In this case, when there are a plurality of printing target locations in the printing target (for example, skin surface of the face), the apparatus main body 100 is placed on the stand 200 after the printing of all printing target locations is finished.

As described above, the printing apparatus 1 according to the present embodiment includes the carriage 42 as the holder that holds the tank 411 that stores the liquid 3, the sensor 6 that detects the state of the motion (movement, vibration) of the tank 411, and a controller 71 that functions as the static condition time obtainer that obtains static condition time of the tank 411 based on the state of the motion (movement, vibration) detected by the sensor and the information outputter that outputs the agitating information of the liquid 3 in the tank 411 based on at least the static condition time (that is, the dispersion information showing the operation to disperse the liquid 3 in the tank 411).

According to the above, it is possible to obtain the "agitating information (dispersion information)" that shows what kind of agitating (dispersion operation) should be performed to make the liquid 3 in the storage 411 an even state from the static condition time of the tank 411 and to notify the information to the user. Therefore, even when the liquid 3 is a cosmetic ink (with a color of the skin) in which titanium dioxide is included as the solute 32, in which the solvent 31 and the solute 32 tend to easily separate, and in which the solute 32 tends to easily settle, the liquid 3 is dispersed again so that printing can be performed after the liquid 3 is in a state suitable for printing.

When the printing is performed in a state in which separation and sedimentation are occurring in the liquid 3, the discharger 412 (nozzle formed in the discharger 412) that discharges the liquid 3 may be clogged and failure in discharging may occur. Moreover, the liquid may be discharged in a state in which the mixture ratio of the solute 32 is high. This may cause the color to become darker than originally planned and the printed color may be uneven. As a result, it is not possible to perform printing with a beautiful finish.

When the user shakes the tank 411 (apparatus main body 100 of the printing apparatus 1 including the tank 411 inside) storing the liquid 3 and the liquid 3 in the tank 411 is agitated, the separation between the solvent 31 and the solute 32 can be resolved.

However, since the state inside the tank 411 cannot be confirmed from outside, the user cannot know the extent that the apparatus needs to be shaken. As a result, the agitating may be insufficient or excessive and may influence to the performance of the apparatus.

Turning to the present embodiment, the controller 71 obtains and outputs the "agitating information" in order to perform suitable agitating. Therefore, the user is able to perform the agitating operation that is not too much or not too little.

According to the present embodiment, the apparatus includes a sensor 6 that detects the vibration of the tank 411. The controller 71 as the static condition time obtainer measures the "static condition time" of the tank 411 based on the information of the vibration detected by the sensor 6.

The apparatus main body 100 of the printing apparatus 1 including the tank 411 is recommended to be placed on the stand 200 when the printing is not performed. The main body sensor 75 detects whether the apparatus main body 100 is placed on the stand 200. However, the user does not always place the apparatus main body 100 on the stand 200 when the printing is not performed. There may be cases such as leaving the apparatus main body 100 on the desk after removing from the stand 200 or stopping with the apparatus main body 100 held in the hand.

In this regard, for example, when the sensor 6 configured with the 6-axis sensor detects the vibration of the tank 411, the "static condition time" can be obtained accurately.

The controller 71 as the information outputter of the present embodiment outputs the "agitating information" considering the information related to the liquid 3 in addition to the "static condition time".

The status of the separation and the sedimentation of the liquid 3 is different depending on the mixture ratio of the solvent 31 and the solute 32 in the liquid 3 and the type of solute 32.

In this regard, it is possible to obtain and output the "agitating information" based on the "static condition time" and the information regarding the liquid 3. With this, it is possible to suitably perform the agitating operation suitable for each type (nature) of the liquid 3.

With this, regardless of what kind of liquid 3 is stored in the tank 411, the entire liquid 3 can be made in an even state suitable for printing.

The "agitating information" according to the present embodiment includes at least one of the following, the method of the agitating operation, the number of times of the agitating operation, and the duration of the agitating operation in order to agitate the liquid 3 by shaking the tank 411.

The effect of the agitating depends on the pattern of the agitating operation, the number of times of the agitating operation and the operation time.

Therefore, the above are suitably combined and shown to the user so as to be able to perform effective agitating according to the status of the separation and sedimentation of the liquid 3.

The controller 71 as the static condition time obtainer of the present embodiment starts measuring the "static condition time" when the vibration detected by the sensor 6 is equal to or less than a predetermined threshold.

As described above, by setting a threshold of the vibration in order to determine whether it is the "static condition" or not, it is possible to determine that it is the "static condition" when there is a fine vibration that is a level not enough to be considered as the agitating of the liquid 3. With this, it is possible to suitably determine the "static condition time".

The sensor 6 according to the present embodiment detects the vibration during the agitating operation by the user and the controller 71 functions as the agitating status obtainer that obtains the "agitating status" based on the information of the vibration during the agitating operation. Then, according to the "agitating status", the suitable operation instruction related to the agitating is output.

With this, when the agitating operation performed by the user is insufficient or the shaking operation is excessive so that a bad influence is applied to the apparatus and the liquid 3, it is possible to request to the user to perform the suitable agitating operation. Therefore, it is possible to prevent the possibility that the user performs printing without noticing that the agitating is not enough or that the user damages the apparatus due to excessive agitating operation.

The present embodiment includes the lamp 16 as the notifier that performs the notification to the user.

With this, it is possible for the user to easily understand what kind of agitating operation should be performed, and whether agitating operation that the user is performing is suitable.

Consequently, even in the configuration in which the mechanism for agitating is not provided in the apparatus and the user performs the operation to agitate the liquid 3, the user is able to perform the suitable agitating operation which is neither insufficient nor excessive.

Although various disclosures are described above, the embodiments are not limited to the above, and various modifications are possible without leaving the scope of the attached claims.

For example, according to the present embodiment, the liquid 3 in the tank 411 is agitated by shaking the tank 411 for each printing apparatus 1 (apparatus main body 100) in the state with the print head 41 including the tank 411 set in the printing apparatus 1 (apparatus main body 100) (that is, the printing apparatus 1 (apparatus main body 100) itself is the apparatus for the agitating ("agitating apparatus" as the liquid dispersion apparatus that disperses the liquid 3)). However, the method to disperse the liquid 3 (liquid dispersion method to disperse the liquid 3) is not limited to shaking the entire printing apparatus 1 (apparatus main body 100).

For example, the agitating of the liquid 3 in the tank 411 (dispersion of the liquid 3) is realized by the agitating apparatus (liquid dispersion apparatus) including the holder that holds the tank 411 that stores the liquid 3, the static condition time obtainer that obtains the static condition time of the tank 411, and the information outputter that outputs the "agitating information" of the liquid 3 in the tank 411 based on at least the "static condition time".

In this case, only the tank 411 storing the liquid 3 or only the print head 41 including the tank 411 is taken out from the printing apparatus 1 and held in the holder of the apparatus (agitating apparatus) for agitating. The user shakes the apparatus for agitating (agitating apparatus) held in the hand and is able to agitate the liquid 3 in the tank 411. The apparatus for agitating (agitating apparatus) is to be a size and a weight so that the user can shake the apparatus by holding the apparatus in the hand, and the specific configuration is not limited.

In this case, the "static condition time" of the tank 411 (time considered to be the "static condition" until the tank 411 is set in the apparatus for agitating (agitating apparatus)) is obtained by the user inputting on the agitating apparatus or the operator 83 of the terminal apparatus 8, and the controller of the agitating apparatus as the static condition time obtainer obtaining the input information. When the information such as the type of the liquid 3 is input, the controller obtains such information also.

Then, as the information outputter, the controller outputs the "agitating information (dispersion information)" related to the liquid 3 in the tank 411 based on the obtained "static condition time" and the type of liquid 3.

When the printing apparatus 1 is not the hand held type, it is difficult for the user to hold the apparatus itself in the hand and to shake the apparatus.

It is possible to assume the print head 41 including the tank 411 storing the liquid 3 that needs agitating and the print head 41 including the tank 411 storing the liquid 3 that can be used without agitating set in one printing apparatus 1. For example, when the printing apparatus is not used for the purpose of the concealer that performs printing using the cosmetics ink as the liquid 3, and designs are printed including various color ink as the liquid 3 (for example, nail print apparatuses), the user may desire to agitate only the ink (liquid 3) in which the separation and sedimentation tend to occur. Further, the printing apparatus such as the nail print apparatus may include the color ink as the liquid 3 and the base ink such as white, and in this case, the user may desire to agitate only the base ink.

In this regard, when the tank 411 (print head 41 including the tank 411) is set in the agitating apparatus and the agitating operation is performed, only the tank 411 storing the liquid 3 that needs to be agitated can be shaken and the liquid 3 can be agitated.

In this case also, what kind of operation needs to be performed to what extent is shown as the "agitating information" to the user, and the user is able to perform the suitable agitating operation according to the "static condition time".

In this case, preferably, the sensor that detects the motion (movement, vibration) during the agitating operation is included in the agitating apparatus.

With this, the controller is able to obtain the information of the vibration as the "agitating status" from the sensor, and as the agitating status obtainer, the operation instruction (operation instruction related to the agitating) according to the "agitating status" can be output.

That is, when the agitating operation is not enough, what operation needs to be performed to what extent is output, and when the degree of vibration is too large, an operation instruction to stop the agitating operation immediately is output.

The operation instruction output from the controller as the agitating status obtainer is suitably output from the display, lamp, and the sound outputter and then notified to the user.

Therefore, the user is able to perform the suitable agitating operation that is neither insufficient nor excessive.

According to the above embodiment, the method to disperse the liquid 3 (resolve the state in which the solvent 31 and the solute 32 are separated) is "agitating", however, the method to disperse the liquid 3 is not limited to the above.

Any method to disperse the liquid 3 can be employed when the tank 411 storing the liquid 3 is moved (vibrated) to disperse the liquid 3 so that the solvent 31 and the solute 32 are substantially even (the solute 32 is dispersed in the solvent 31, "31≅32" shown in FIG. 4A).

According to the present embodiment, the main body sensor that detects that the apparatus main body 100 of the printing apparatus 1 is placed is provided in the stand 200. However, the sensor that detects the apparatus main body 100 is placed in the stand 200 can be provided in the apparatus main body 100.

For example, an identifier can be provided in the stand 200 and when the sensor of the apparatus main body 100 detects the identifier, it may be considered that it is detected that the apparatus main body 100 is placed in the stand 200.

Moreover, for example, the stand 200 may be imaged by the imaging apparatus 51 of the apparatus main body 100, and it may be detected that the apparatus main body 100 is placed in the stand 200 from the relation of the positions.

According to the present embodiment, the printing is performed by the printing apparatus 1 linked with the terminal apparatus 8, but the printing apparatus 1 is not limited to the apparatuses described above, and may be configured so that the printing apparatus is completed in the single device.

For example, according to the present embodiment, the input of the instruction to start printing and the setting of the printing target locations are performed on the operator 83 or by the controller 81 in the terminal apparatus 8. However, the input of various instructions and setting can be performed on the controller 11 of the printing apparatus 1 or the controller 71. In this case, a touch panel type operator can be provided on the printing apparatus 1. The printing apparatus 1 may include a display, and in this case the touch panel can be provided as one with the display.

Although various embodiments are described above, the scope is not limited to the above embodiments, and the scope of the disclosure includes the scope described in the attached claims and its equivalents.

What is claimed is:

1. A printing apparatus comprising:

at least one processor;

an apparatus main body that is capable of holding a tank that stores liquid; and a sensor that detects at least a state of motion of the tank, wherein the processor outputs dispersion information showing an operation to move the apparatus main body to disperse the liquid in the tank based on the state of the motion of the tank detected by the sensor, wherein the processor obtains a static condition time which is an amount of time that the state of the motion of the tank is equal to or less than a threshold, and wherein the processor outputs the dispersion information based on the obtained static condition time.

2. The printing apparatus according to claim 1, wherein the processor outputs the dispersion information based on the static condition time and the information related to the type of liquid.

3. The printing apparatus according to claim 1, wherein the processor starts measuring the static condition time in response to the motion of the tank detected by the sensor being equal to or less than the threshold.

4. The printing apparatus according to claim 1, wherein the dispersion information includes information showing a combination of a method of the operation and at least one among a number of times of the operation, a duration of the operation, a swing width of the operation, and a velocity of the operation.

5. The printing apparatus according to claim 1, wherein the sensor detects the motion of the tank during the operation, wherein the processor obtains a dispersion status based on information of the motion of the tank during the operation, and wherein the processor outputs an instruction related to the operation based on the dispersion status.

6. The printing apparatus according to claim 1, further comprising a notifier that notifies the dispersion information.

7. An information processing method comprising:

detecting at least a state of motion of a tank that stores liquid and that is held in a printing apparatus, obtaining a static condition time which is an amount of time that the state of the motion of the tank is equal to or less than a threshold, and outputting, based on the obtained static condition time, dispersion information showing an operation to move a main body of the printing apparatus to disperse the liquid in the tank based on the detected state of the motion of the tank.

8. The information processing method according to claim 7, further comprising outputting the dispersion information based on the static condition time and the information related to the type of liquid.

9. The information processing method according to claim 7, further comprising starting measuring the static condition time in response to the detected motion of the tank being equal to or less than the threshold.

10. The information processing method according to claim 7, wherein the dispersion information includes information showing a combination of a method of the operation and at least one among a number of times of the operation, a duration of the operation, a swing width of the operation, and a velocity of the operation.

11. The information processing method according to claim 7, further comprising, detecting the motion of the tank during the operation, obtaining a dispersion status based on information of the motion of the tank during the operation, and outputting an instruction related to the operation based on the dispersion status.

12. The information processing method according to claim 7, further comprising notifying the dispersion information.

13. A non-transitory computer-readable storage medium having a program stored thereon for controlling a computer to perform:

detecting at least a state of motion of a tank that stores liquid and that is held in a printing apparatus, obtaining a static condition time which is an amount of time that the state of the motion of the tank is equal to or less than a threshold, and outputting, based on the obtained static condition time, dispersion information showing an operation to move a main body of the printing apparatus to disperse the liquid in the tank based on the detected state of the motion of the tank.

14. The storage medium according to claim 13, wherein the computer performs outputting the dispersion information based on the static condition time and the information related to the type of liquid.

15. The storage medium according to claim 13, wherein the computer performs starting measuring the static condition time in response to the detected motion of the tank being equal to or less than the threshold.

16. The storage medium according to claim 13, wherein the dispersion information includes information showing a combination of a method of the operation and at least one among a number of times of the operation, a duration of the operation, a swing width of the operation, and a velocity of the operation.

17. The storage medium according to claim 13, wherein the computer controls a notifier that notifies the dispersion information.

18. A printing apparatus comprising:

at least one processor;

an apparatus main body that is capable of holding a tank that stores liquid; and a sensor that detects at least a state of motion of the tank, wherein the processor outputs dispersion information showing an operation to move the apparatus main body to disperse the liquid in the tank based on the state of the motion of the tank detected by the sensor, wherein the dispersion information includes information showing a combination of a method of the operation and at least one among a number of times of the operation, a duration of the operation, a swing width of the operation, and a velocity of the operation.

19. A printing apparatus comprising:

at least one processor;

an apparatus main body that is capable of holding a tank that stores liquid; and a sensor that detects at least a state of motion of the tank, wherein the processor outputs dispersion information showing an operation to move the apparatus main body to disperse the liquid in the tank based on the state of the motion of the tank detected by the sensor, wherein the sensor detects the motion of the tank during the operation, wherein the processor obtains a dispersion status based on information of the motion of the tank during the operation, and wherein the processor outputs an instruction related to the operation based on the dispersion status.

* * * * *